US011641330B2

(12) United States Patent
Flöther et al.

(10) Patent No.: US 11,641,330 B2
(45) Date of Patent: May 2, 2023

(54) COMMUNICATION CONTENT TAILORING

(71) Applicant: International Business Machines Corporation, Armonk, NY (US)

(72) Inventors: Frederik Frank Flöther, Schlieren (CH); Shikhar Kwatra, Raleigh, NC (US); Patrick Lustenberger, Zurich (CH); Stefan Ravizza, Wallisellen (CH)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 16/987,024

(22) Filed: Aug. 6, 2020

(65) Prior Publication Data

US 2022/0045975 A1    Feb. 10, 2022

(51) Int. Cl.
 *G06F 40/35* (2020.01)
 *H04L 51/046* (2022.01)
 (Continued)

(52) U.S. Cl.
 CPC .......... *H04L 51/046* (2013.01); *G06F 40/253* (2020.01); *G06F 40/35* (2020.01); *G06F 40/56* (2020.01); *G06N 20/20* (2019.01)

(58) Field of Classification Search
 CPC ................. H04L 51/046; H04L 51/063; H04L 51/216; G06N 3/0454; G06N 5/02; G06N 20/00
 See application file for complete search history.

(56) References Cited

U.S. PATENT DOCUMENTS 7,330,895 B1   2/2008 Horvitz
9,317,816 B2   4/2016 Zeng
(Continued)

FOREIGN PATENT DOCUMENTS

CN   110717051 A   1/2020
CN   111159368 A   5/2020
(Continued)

OTHER PUBLICATIONS

Anonymous. "Q-learning" Accessed Jul. 16, 2020. 8 pages. Published by Wikipedia. https://en.wikipedia.org/wiki/Q-learning#Algorithm.
Anonymous. "Reinforcement learning." Accessed Jul. 16, 2020. 13 pages. Published by Wikipedia. https://en.wikipedia.org/wiki/Reinforcement_learning#/media/File:Reinforcement_learning_diagram.svg.
(Continued)

*Primary Examiner* — Jesse S Pullias
(74) *Attorney, Agent, or Firm* — Jared L. Montanaro; Heather Johnston

(57) ABSTRACT

A method for personalizing a message between a sender and a receiver is provided. The method comprises semantically analyzing a communication history to form a knowledge graph, deriving formality level values using a first trained ML model, analyzing parameter values of replies to determine receiver impact score, and training a second ML system to generate a model to predict the receiver impact score value. The method also comprises selecting a linguistic expression in a message being drafted, determining an expression intent, modifying the linguistic expression based on the formality level and the expression intent to generate a modified linguistic expression, and testing whether the modified linguistic expression has an increased likelihood of a higher receiver impact score. The method also comprises repeating selecting the linguistic expression, determining the expression intent, modifying the linguistic expression, and testing until a stop criterion is met.

25 Claims, 9 Drawing Sheets

(51) Int. Cl.
*G06F 40/253* (2020.01)
*G06F 40/56* (2020.01)
*G06N 20/20* (2019.01)

(56) References Cited

U.S. PATENT DOCUMENTS

| | | | |
|---|---|---|---|
| 10,127,115 | B2 | 11/2018 | Kandylas |
| 10,169,827 | B1 | 1/2019 | Paulus |
| 10,587,537 | B2 | 3/2020 | Silva |
| 2007/0244978 | A1 | 10/2007 | Larsen |
| 2010/0223341 | A1 | 9/2010 | Manolescu |
| 2012/0253790 | A1* | 10/2012 | Heck .................. G06F 16/9535 707/769 |
| 2012/0284080 | A1 | 11/2012 | De Oliveira |
| 2013/0253910 | A1 | 9/2013 | Turner |
| 2015/0019618 | A1 | 1/2015 | Brookfield |
| 2015/0341304 | A1* | 11/2015 | Sherman .............. H04L 67/306 709/206 |
| 2017/0185590 | A1 | 6/2017 | Tetreault |
| 2017/0185591 | A1* | 6/2017 | Tetreault ................ G06F 40/56 |
| 2017/0243134 | A1 | 8/2017 | Housman |
| 2018/0375877 | A1 | 12/2018 | Jakobsson |
| 2019/0325863 | A1* | 10/2019 | Martin ............. G06F 16/90335 |
| 2020/0065857 | A1 | 2/2020 | Lagi |
| 2021/0117780 | A1* | 4/2021 | Malik ................... G06N 5/022 |

FOREIGN PATENT DOCUMENTS

| | | | |
|---|---|---|---|
| EP | 3557501 | A1 | 10/2019 |
| JP | 4191412 | B2 | 12/2008 |
| WO | 2019113122 | A1 | 6/2019 |
| WO | 2022029594 | A1 | 2/2022 |

OTHER PUBLICATIONS

Dewan, M., et al., "Engagement detection in online learning: a review." Published Jan. 3, 2019. Accessed Jul. 20, 2020. 55 pages. Published by Springer Nature. https://slejournal.springeropen.com/articles/10.1186/s40561-018-0080-z#Fig1.

Gandhi, Rohith. "Generative Adversarial Networks—Explained." Published May 10, 2018. Accessed Jul. 20, 2020. 8 pages. Published by Towards Data Science. https://towardsdatascience.com/generative-adversarial-networks-explained-34472718707a.

Knapton, Sarah. "AlphaGo Zero: Google DeepMind supercomputer learns 3,000 years of human knowledge in 40 days." Published Oct. 18, 2017. Accessed Jul. 16, 2020. 6 pages. Published by The Telegraph. https://www.telegraph.co.uk/science/2017/10/18/alphago-zero-google-deepmind-supercomputer-learns-3000-years/.

Lei, Nin. "Generative Adversarial Network technology: AI goes mainstream." Published Sep. 17, 2019. Accessed Jul. 20, 2020. 6 pages. Published by IBM. https://www.ibm.com/blogs/systems/generative-adversarial-network-technology-ai-goes-mainstream/.

Liu, Z., et al., "Knowledge Aware Conversation Generation with Explainable Reasoning over Augmented Graphs." Published 9/319. Accessed Jul. 20, 2020. 11 pages. Published by ARXIV. https://arxiv.org/abs/1903.10245.

Martin, Andrew. "Intro to Adversarial Machine Learning and Generative Adversarial Networks." Published Oct. 2019. Accessed Jul. 20, 2020. 10 pages. Published by KDnuggets. https://www.kdnuggets.com/2019/10/adversarial-machine-learning-generative-adversarial-networks.html.

Mell et al., "The NIST Definition of Cloud Computing," Recommendations of the National Institute of Standards and Technology, U.S. Department of Commerce, Special Publication 800-145, Sep. 2011, 7 pgs.

Pielmeier, Helene. "The Next Revolution in Conference Interpreting." Published Apr. 15, 2019. Accessed Jul. 20, 2020. 6 pages. Published by CSA Research. https://csa-research.com/Insights/ArticleID/536/machine-based-interpreting.

Rocca, Joseph. "Understanding Generative Adversarial Networks (GANs)." Published Jan. 7, 2019. Accessed Jul. 20, 2020. 24 pages. Published by Towards Data Science. https://towardsdatascience.com/understanding-generative-adversarial-networks-gans-cd6e4651a29.

Xu, Joyce. "Beyond DQN/A3C: A Survey in Advanced Reinforcement Learning." Published Oct. 1, 2018. Accessed Jul. 20, 2020. 18 pages. Published by Toward Data Science. https://towardsdatascience.com/advanced-reinforcement-learning-6d769f529eb3.

International Search Report and Written Opinion, International Application No. PCT/IB2021/057037, International Filing Date Aug. 2, 2021.

\* cited by examiner

COMMUNICATION CONTENT TAILORING

BACKGROUND

The disclosure relates generally to a method for personalizing a message, and more specifically, to a method for personalizing a message to be sent from a sender to a receiver. The disclosure relates further to a message personalizing system and computer program product for personalizing a message between a sender and a receiver.

The amount of data managed in electronic communication systems is ever-increasing. This is true for classic email messages, chat messages, social media messages, and other forms of modern communication platforms. It has also become common to use more informal electronic communication mechanisms, such as voicemail, in business correspondence and marketing. The number of messages being sent in any of the above-mentioned ways is also increasing and, in many cases, the length of a single message is decreasing. This may result in misunderstandings and miscommunications using electronic media. Additionally, a message tailored for one recipient may "hit the nail on the head" in the context between the sender and one recipient but may be completely content-free in the context between the sender and another recipient. Therefore, messages should be tailored to both the requirements and the context of a recipient in order to achieve the proper and maximum impact.

However, many messages are sent by a non-concentrated sender. Alternatively, marketing messages may be sent out to a large audience in which each receiving individual has a unique history and thus different contexts when receiving the message. Hence, the impact for the plurality of receivers may vary significantly. In order to address this problem, prior to marketing campaigns, highly complex sentiment analyses are often performed in order to send context-specific messages to individual receivers or small groups of receivers. These sentiment analyses are a major effort if electronic communication systems and platforms are used for marketing. Additionally, the same weakness can be observed in many 1:1 messages because the sender does not know the complete context of the receiver or how the receiver may interpret the message content because it was necessarily generated in the context of the sender.

Some attempts have already been made to address these problems. U.S. Patent Publication 2012/0265528 A1 discloses a virtual assistant which uses context information to supplement natural language or gestural check input from a user. The context helps to clarify the user's intent to reduce the number of candidate interpretations of the user's input, and reduces the need for the user to provide excessive clarification input.

Furthermore, U.S. Patent Publication 2013/0253910 A1 discloses a method for analyzing text within a digital document. In some cases the analysis can include receiving and/or generating a digital document with processing circuitry and determining a distribution of each of a plurality of document terms based on occurrences of the document terms within the text sample.

However, the known technologies do not take into consideration the complete context of a recipient and therefore may not appropriately tailor the message to decrease the probability for misinterpretation by the recipient. Therefore, there is a need for better personalization of messages.

SUMMARY

According to one aspect of the present disclosure, a method for personalizing a message between a sender and a receiver may be provided. The method may comprise semantically analyzing a communication history between the sender and the receiver and forming a knowledge graph between a sender identifier identifying the sender and a receiver identifier identifying the receiver. Furthermore, the method may comprise deriving from the knowledge graph formality level values between the sender and the receiver, using a first trained machine-learning model, analyzing parameter values of replies in the communication history to determine receiver impact score values and training a second machine-learning system to generate a model to predict the receiver impact score value based on the knowledge graph and the formality level.

Additionally, the method may comprise selecting a linguistic expression in a message being drafted, determining an expression intent of the selected linguistic expression, and modifying the linguistic expression based on the formality level and the expression intent, thereby generating a modified linguistic expression.

Also part of the method may be testing if the modified linguistic expression has an increased likelihood to lead to a higher receiver impact score value using a third trained machine-learning model and repeating the steps of selecting the linguistic expression, determining the expression intent, modifying the linguistic expression and testing until a stop criterion is met.

According to another aspect of the present disclosure, a message personalizing system for personalizing a message between a sender and a receiver may be provided. The message personalizing system may comprise first analysis means adapted for semantically analyzing a communication history between the sender and the receiver, and adapted for forming a knowledge graph between a sender identifier identifying the sender and a receiver identifier identifying the receiver, deriving means adapted for deriving from the knowledge graph formality level values between the sender and the receiver, using a first trained machine-learning model, second analysis means adapted for analyzing parameter values of replies in the communication history to determine receiver impact score values, and training means adapted for training a second machine-learning system to generate a model to predict the receiver impact score value based on the knowledge graph and the formality level.

Moreover, the message personalizing system may comprise selection means adapted for selecting a linguistic expression in a message being drafted, determination means adapted for determining an expression intent of the selected linguistic expression, modification means adapted for modifying the linguistic expression based on the formality level and the expression intent, thereby generating a modified linguistic expression and test means adapted for testing if the modified linguistic expression has an increased likelihood to lead to a higher receiver impact score value using a third trained machine-learning model.

Moreover, the message personalizing system may comprise repetition means adapted for triggering the selection means, the determination means, modification means and the test means until a stop criterion is met.

The proposed method for personalizing a message between a sender and a receiver may offer multiple advantages, technical effects, contributions and/or improvements.

The proposed concept may represent a tool to help "bring across a message" in the most effective way. It may overcome the old saying according to which a message should be packaged seven times in a different way in order to really get the message across. The system proposed here may be a shortcut to the communication rule of thumb just mentioned.

A message to be drafted (and to be sent) may be modified by an interaction of the plurality of machine learning systems before the message will be sent actively.

In order to achieve this, the proposed method and the related system may examine and analyze historic communication fragments between a sender and a related receiver or recipient in order to determine different parameters, like a topic, an understanding of it, a specific topic, used vocabulary, a relationship between the sender and the receiver and other available context and metadata. Based on these experienced data a message to be written may also be dynamically analyzed online before the message may be sent in order to predict what kind of impact—e.g., what kind of effect—the message formulated in a specific way may have on the recipient. Also this may depend on the plurality of different parameters, all of which may be used if known.

Hence, the proposed concept may help to avoid misunderstandings and time-consuming back and forth questions in order to achieve real, fast and effective progress in an ongoing communication. In particular, it may also allow cultural, linguistic, and individual barriers to be overcome in the quest to make communication smoother and more effective.

Thereby, the proposed concept may not only work in a one-to-one communication but also in a one-to-many communication because the messages may be tailored to an individual recipient or also to a group of recipients having, e.g., a comparable communication history. The tailoring of the message may also be based on other parameters, like selected member group characteristics.

The pure technical advantage may be seen in the fact that fewer messages may have to be stored in electronic communication systems of any kind such that less storage capacity may be needed in total. Additionally, communication bandwidth may be saved because fewer messages are sent back and forth in order to answer back questions.

In the following, additional embodiments—applicable to the method as well as to the system—will be described.

According to an advantageous embodiment of the method, the third machine-learning model may be a reinforcement learning model, e.g., based on a reinforcement learning system. This way, the involved software agent may act in a way to maximize some notion of reward, e.g., a reward function, and in this special case, the expected impact of the modified message to the receiver.

According to an enhanced embodiment of the method, the training of the third machine-learning model may also comprise using a bi-directional transformer. This may also be seen as a forth machine-learning model and system involved in the method which is here based on the BERT (Bidirectional Encoder Representations from Transformers) model to predict the expression intent. Hence, the here proposed method may make use of the newest text interpretation and NLP techniques using a unsupervised ML model for language representations which is pre-trained using only a plain text corpus. Thereby, BERT may take into account the context for each occurrence of a given word or phrase. For instance, whereas the vector for "running" may have the same word2vec vector representation for both of its occurrences in the sentences "He is running a company" and "He is running a marathon", BERT may provide a contextualized embedding that will be different according to the sentence.

According to another embodiment of the method, the training of the bi-directional transformer may comprise using as training data the communication history, the knowledge graph, the derived formality levels and receiver impact score values. Hence, the full spectrum of available and historically given, derived and constructed (e.g., in the knowledge graph) data and dependencies between selected ones of the data points may be made available for the bi-directional transformer, e.g., the BERT model. This may allow a more or less complete set of input data for optimizing the final message formulation to the receiver for a maximum of impact.

According to a further developed embodiment of the method, the receiver identifier may be a plurality of receiver identifiers used to identify a plurality of users, and the modified linguistic expression may be built taking effects of all receiver identifiers into account. Hence, the proposed concept may not only be advantageous in a 1:1 communication task but also in a 1-to-many communication task. Thereby, it may be useful to build average values for data relating to a plurality of target identifiers and/or also using weighing function, e.g., based on formality level values, weighing on topics, e.g., using a look-up table for weights and topics and potentially, e.g., receiver IDs. It may also be possible to create different versions of the modified message for different receivers or groups of receivers. The last aspect may be particularly interesting in mass communication and social media advertising.

According to an advance embodiment of the method, the modification of the linguistic expression may be influenced—e.g., it's modified version—by outcomes of at least one selected out of the formality level analysis, a confidentiality level analysis of the message, a message topic analysis, and atone analysis, which may be identified to be friendly, aggressive, or cooperative, etc. The influence may be based on an influence function the result of which are the analysis result and the analysis' outcomes may be used as arguments of the function.

According to one further advanced embodiment of the method, the modification of the linguistic expression may be performed by at least one selected out of a replacement of a word, spinning of sentence structure, reordering of content, deletion of a word, re-shuffle an order of message blocks, use of synonyms, include wording which was used by the receiver in past communication, adjust the style—in particular, guiding the style adjustments using the personality insights profile from the receiver—and a GPT2 (generative pre-training mode based on Open AI) transformer transformation, wherein the GPT2 transformer transformation is inculcated with partial sentence creation to generate the rest of the paragraph in a personalized manner by synthesizing personalized text for the user. Hence, all or most aspects of a modification of the message may be addressed which would also be used by a consciousness and full focused user. However, many messages may only be typed without the full attention of the sender. However, the here proposed system using this here-described feature may increase the effect the sent message may unfold.

According to an interesting embodiment of the method, the semantic analysis of the communication history may comprise identifying topics with the latent Dirichlet allocation (LDA) topic model. Thereby, the advantages of the LDA topic model may be incorporated into the here proposed concept, namely, through the ability of LDA to model documents through the process of receiving a number of topics by a user, and identifying topics based on the multinominal distributions of the Dirichlet distribution of terms in a document collection.

Hence, the proposed method may also easily work in environments in which the communication history did not only circle around a discussion topic but which comprises a plurality of different topics.

According to a permissive embodiment of the method, the formality level may be obtained with a bag-of-words model and the first trained machine-learning model may be a Gaussian Naïve Bayes classifier. Thereby, the bag-of-words model is a simplifying representation often used in natural language processing and information retrieval. In this model, a text (such as a sentence or a document) may be represented as the bag (multiset) of its words, disregarding grammar and even word orders but keeping multiplicity. Additionally, the usage of the Gaussian Naïve Bayes classifier may be an option to use a comparably simple probabilistic classifier based on applying Bayes' theorem with strong (naïve) independence assumptions between the features. This may help to keep the computer-implemented version of the proposed concept efficient and not too resource hungry.

According to a useful embodiment of the method, the linguistic expression may further be refined by predicting the receiver's mood or tasks at the time at which the message is set to arrive using IoT (Internet-of-Things) sensors and/or calendar information. This may be implemented by fetching sensor specific instructions and storing the retrieved information in a private (cloud) repository for running the model. Thus, the method may also use additional data sources over and above the usage of the communication history but also the expected experience world of the receiver.

According to another advanced embodiment of the method, the receiver impact score may be influenced by—in the sense of being a function of—at least one selected out of IoT sensor data, wearable system data, computer vision data, presence/absence of a reply, timing of a reply, timing of a reply in relation to other replies by the same recipients or different recipients, timing of a reply in relation to time zones and calendars, presence/absence of out-of-office messages, length of the reply, content of the reply, a task requested by the sender being carried out by the receiver—and e.g., confirming this via a reply—and an emoji (e.g., ideograms and/or smiley-like character combinations used in electronic messages).

This way, the receiver's personal environmental data like his heartbeat/blood-pressure data, specific body movements, facial expressions, environmental parameter values (e.g., temperature, humidity, atmospheric, pressure, etc. may be used to better understand the impact of a given message to be sent.

According to a further optional embodiment of the method, the message may be a written message, like an email or a chat comment, or a voice message. For this, also the voice communication history may be used as part of the historic communication data.

According to a another optional embodiment of the method, in case the analysis may result in the fact that no communication history exists, a communication history between the receiver and another sender replaces the communication history between the sender and the receiver. Therefore, the proposed concept may also be applicable between a sender and a receiver which do not have a communication history, hence a new target audience. This may particularly helpful in marketing email bursts in which many new recipients may be addressed.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

Various aspects of the present disclosure are apparent from the examples of embodiments to be described hereinafter and are explained with reference to the examples of embodiments. One skilled in the art will recognize alterations and modifications; thus, the disclosure is not limited to the disclosed embodiments. Embodiments of the disclosure will be described by way of example only and with reference to the following drawings.

Figure 1:
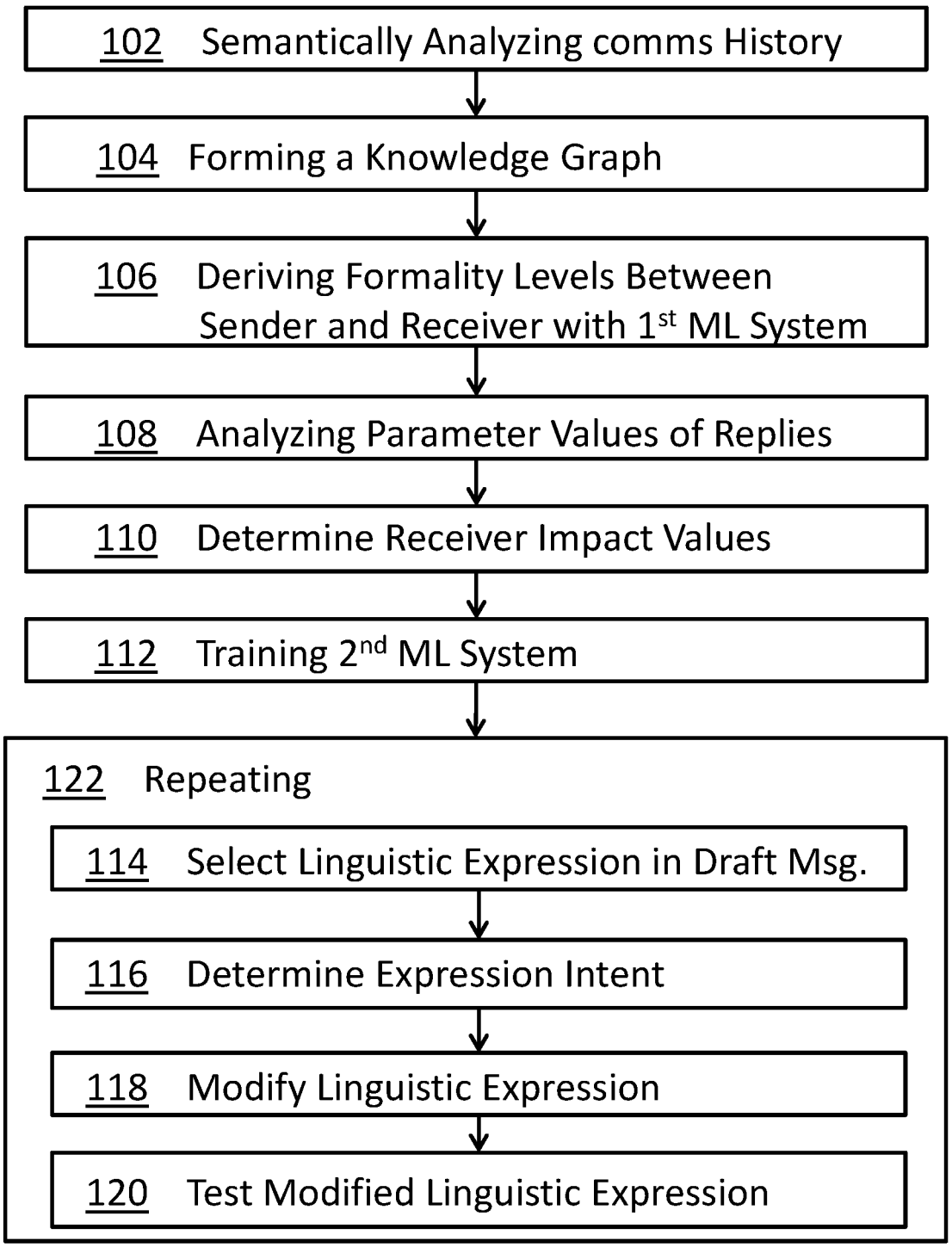
FIG. 1 shows a block diagram of an embodiment of the method for personalizing a message between a sender and a receiver.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims and features of the apparatus type claims, is considered as to be disclosed within this document.

In the context of this description, the following conventions, terms and/or expressions may be used.

The term "communication history" may denote, in a simple case, sent and received emails between a sender and a receiver regarding one topic. In more complex cases, the communication history may relate to a group of emails relating to a plurality of topics between the sender and the receiver or even to all emails across multiple email systems between the sender and the receiver. Additionally, emails to other recipients of both the sender and the receiver may be taken into account. Moreover, other forms of electronic communication channels, particularly chat systems or other collaboration tools, may provide data for the communication history. Furthermore, voice and/or video messages may be used for the communication history.

The term "sender" may denote an originator of a message to be drafted and/or sent to a designated recipient. In the simple case of an email system, the designated recipient is the reader of an email message sent to an email address. The sender may also send messages using other communication systems.

The term "receiver" or "recipient" may denote an individual reading an email sent by a sender which is addressed to an email address affiliated with the same individual reading the email. A receiver may receive messages via other electronic communication channels.

The term "knowledge graph" may denote a data structure comprising nodes and edges. The nodes typically store facts, and edges selectively link nodes. Edges may store information on relationships between facts; as facts are typically stored in nodes, edges may store information about relationships between nodes and between facts and nodes. The information about fact relationships may also comprise weighing factors.

The term "sender identifier," in the simple case of a neural system, may denote the email address of the sender. The same may apply to a receiver/recipient and a related receiver identifier: the term "receiver identifier" and "recipient identifier" may denote the email address of the receiver/recipient in the simple case of a neural system.

The term "formality level value" may denote values describing a formal relationship which may exist between a sender person and a receiver person. Formality level values are typically numeric; they may be expressed as alphanumeric strings. The relationship between a sender person and a receiver person may be described as a friendship, an employee/employer relationship, an authority/citizen relationship, and so on. The formality level value may have an influence on the way a message may be formulated using an electronic communication system.

The term "first trained machine-learning model" may denote a trained model to derive—in particular, to classify—the formality level value based on the communication history. A first trained machine-learning model may specifically be trained to classify the formality level value based on communication history data. The underlying machine learning system may be a classification system. The underlying machine learning system may be based on a supervised learning approach.

The term "parameter value of a reply" may denote a dedicated analysis value characterizing and relating directly to an impact score value. Typically, higher parameter values of a reply may denote a higher impact by a received message with respect to the recipient. The impact may be measured in different ways such as speed of response, the decisiveness of the response, and the tone of the response action triggered, among other ways. The response may include an email sent to another person, a phone call made, a web page opened, and so on.

The term "receiver impact score value" may denote a measurable value expressing the impact of a received message. A receiver impact score value may be derived from parameter values of replies.

The term "second machine-learning system" may denote a trained machine learning model for predicting an impact score value to a recipient of a newly drafted or modified message based on the available information. Available information may include the knowledge graph and the derived formality level between the sender and the receiver. A second machine-learning system may use a supervised learning approach.

The term "linguistic expression" may denote a phrase in a longer message comprising one or more sentences. In particular, a linguistic expression may be one, two, or a few directly related words.

The term "expression intent" may denote the intention, purpose, or aim of content of a specific linguistic expression within a message.

The term "modifying," with respect to modifying a message to be drafted, may denote that one or more linguistic expressions of the message to be sent may be changed, adapted, or amended without altering the expression intent. If more than one linguistic expression would be modified within the limits of the expression intent, then the overall intent of the message to be drafted shall also not be modified.

The term "third trained machine-learning model" may denote another machine learning system that predicts if a modified linguistic expression may lead to a higher impact score value of a modified linguistic expression or a modified message. If that is the case, the modified message may be sent out from the sender; if that is not the case, the modified message may be prevented from being sent out from the sender. A third trained machine-learning model may use a related machine learning model to predict changes in impact score values as linguistic expression is modified.

The term "reinforcement learning" and modeling based on reinforcement learning may denote an area of machine learning concerned with how a software agent may take actions in an environment in order to maximize the notion of a cumulative reward. Wherein the first two basic machine learning paradigms are supervised learning and unsupervised learning, reinforcement learning is the third basic machine learning paradigm. Reinforcement learning is currently the most frequently used paradigm. Basically, the underlying algorithms focus on finding a balance between the exploration of uncharted territory and the exploitation of current knowledge. In one embodiment, the uncharted territory may be the modified linguistic expression, and the current knowledge may be information derived from communication history.

The term "bi-directional transformer" may denote a system or technique for natural language processing based on bidirectional encoder representations from transformers (BERT). BERT was developed and published by Jacob Devlin et al. BERT is often used in search engines.

A detailed description of the figures is provided. All instructions in the figures are schematic. The first figure presents a block diagram of an embodiment of the method for personalizing a message between a sender and a receiver. Further embodiments of the method are then described as well as embodiments of a system using the method. Specifically, the described system is a message personalizing system for personalizing a message between a sender and a receiver.

FIG. 1 shows a block diagram of a preferred embodiment of a method 100 for personalizing a message between a sender and a receiver. Method 100 may be viewed as having a first phase (operations 102-112) and a second phase (operations 114-120). In a first phase, method 100 comprises semantically analyzing a back and forth communication history between the sender and the receiver, at operation 102. This may comprise every available electronic message sent between the sender and the receiver including the affiliated metadata. The metadata of the electronic messages may include the time of the messages, time periods between messages, environmental data, sensor data, captured health data, and so on. Based on the semantic analysis of the communications history, method 100 further comprises forming a knowledge graph, at operation 104, between a sender identifier which identifies a sender and a receiver identifier which identifies a receiver.

Based on the knowledge graph, method 100 comprises deriving from the knowledge graph formality level values, at operation 106, between a sender and a receiver. Thereby, a first trained machine-learning model is used which is pre-trained based on all available information between the two constituents. Formality level values which may be derived from the knowledge graph may include, expressions of respect, friendship, business relationship, dependency of relationships, working relationships, among other things.

Method 100 also comprises analyzing parameter values of replies, at operation 108, in the communication history to determine receiver impact score values at operation 110. Receiver impact score values may be values indicative of a reaction the message provoked from the receiver.

Method 100 also comprises training a second machine-learning system, at operation 112, to generate a machine learning model to predict the receiver impact score value based on the knowledge graph and the formality level. A supervised machine learning approach may be used to train the second machine-learning system. This step may conclude the preparatory phase (e.g., first phase) of the method 100.

A second phase of method 100 relates to specific messages between the sender to the receiver. More specifically, method 100 also comprises selecting a linguistic expression in a message being drafted at operation 114, determining an expression intent, at operation 116, of the selected linguistic expression, and modifying the linguistic expression, at operation 118, based on the formality level and the expression intent, thereby generating a modified linguistic expression. Hence, the same message with a different wording and a better expected impact may be used instead of the original draft of message. The message being drafted may be drafted by a sender. An expression intent may be determined using the BERT model.

Method 100 further comprises testing of a modified linguistic expression at operation 120. Testing, at operation 120, checks to see if a modified linguistic expression an increased likelihood to lead to a higher receiver impact score value using a trained machine-learning model. Testing, at operation 120, may be done using a reinforcement machine learning model.

To address a longer message, method 100 may also comprise a repeating 122 of the second phase (operations 114-120) of method 100 until a stop criterion is met. An example for such a stop criterion may be that no significant changes in the value of the receiver impact score are measured from two successive simulations.

Figure 2:
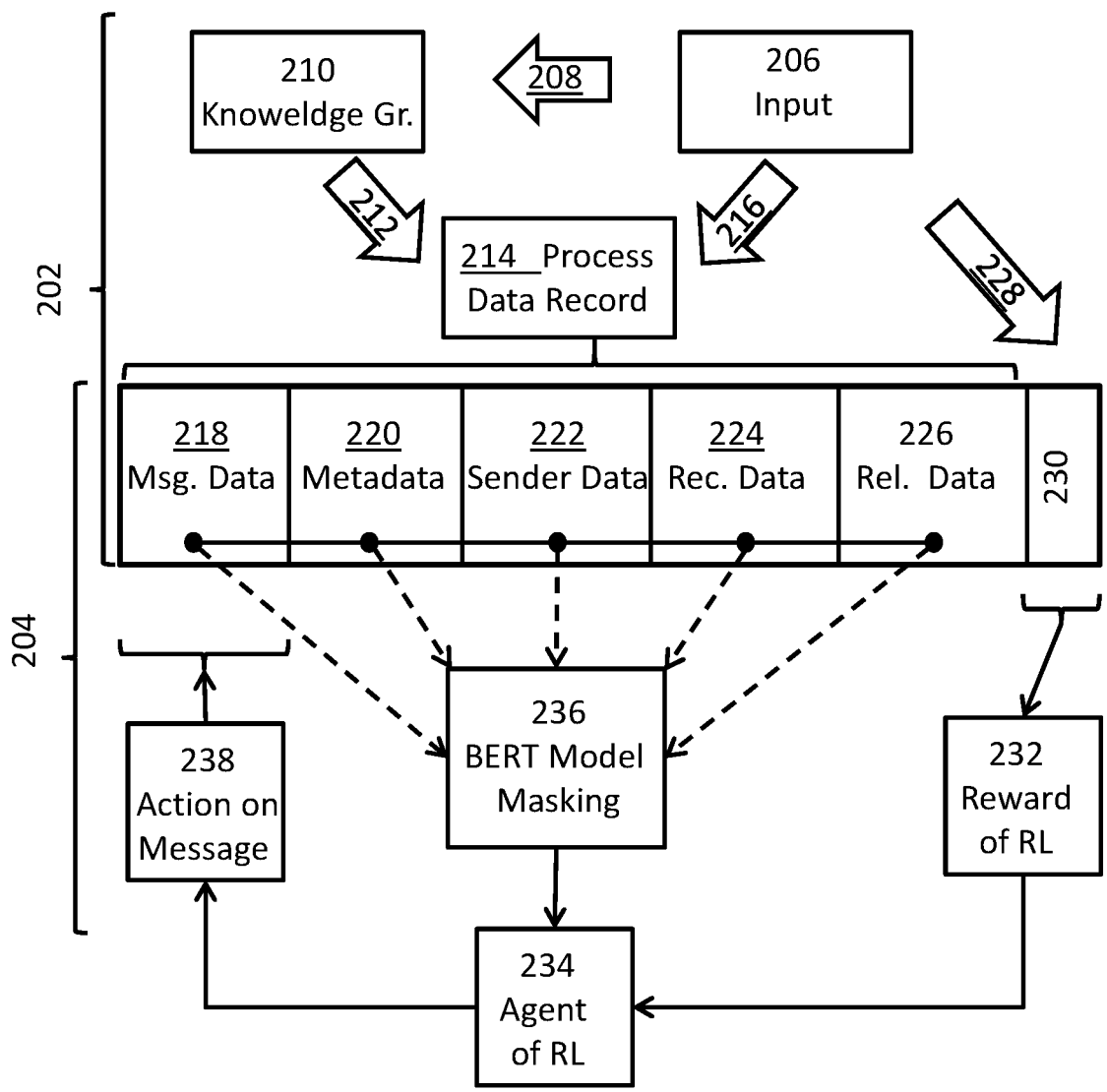
FIG. 2 shows a block diagram of an overview of components instrumental for the method for personalizing a message between a sender and a receiver.

FIG. 2 shows a block diagram of an overview of components 200 for implementing method 100. Elements in group 202 relate to the first phase of method 100 and elements of group 204 relate to the second phase of method 100. In short, the processing steps of the first phase use the communication history, a knowledge graph, and a trained supervised machine learning model to predict the likelihood of a message impacting a recipient. In an alternative implementation, the processing steps of the first phase may use social media data in lieu of communication history. The second phase is the reinforcement learning model that adapts the message to increase the impact on the receiver.

Portions of communication, such as text, can then be leveraged by a reinforcement learning model agent 234 which can automatically manipulate the original message and test if adjusted versions have a higher likelihood to lead to a more favorable action as a result of the impact on the receiver.

Hence, the data flow is as follows: input data 206 is processed 208 to build a knowledge graph 210. For example, input data may be in the form of communication history such as email, chat, and/or social media. An analysis of the raw input data is performed. The analysis may be performed using, for example, sentiment analysis, tone analyzer, and/or personal insights. This raw data plus the analysis results are then ingested in the knowledge graph 210. The knowledge graph 210 may be seen as a first machine learning component.

The raw data may comprise message data 218, metadata 220, sender data 222, receiver data 224, and relationship data 226. In a further enhanced implementation, computer vision data as well as other data may be included. The output of this phase represents the raw and analysis data. In particular, the analysis results and the knowledge graph represent the raw and analysis data.

The raw data and analysis data are then used 212 and 216, respectively, for a next preprocessing step 214 to develop a second machine learning model. A supervised machine learning approach is used to enrich the already preprocessed data with additional information. For example, formality scores may be used to enrich the preprocessed data.

Using this second machine learning model 228, matching scores are calculated 230 and a supervised machine learning model is trained. This training of the supervised machine learning model allows as an output of predictions of matching scores of a given portion of piece of communication from the supervised machine learning model. Predictions of matching scores may also be denoted as engagement score on impact.

In a next step of the method, a reinforcement learning system 234 iterates a message to form a tailored message. As reward function input of the reinforcement learning 232, the following components may be used: the initial message as well as the input and output of the above-described step. The input and output of the above-described step may include raw data, analysis results, knowledge graph data, formality scores, and output of the second machine learning model to calculate matching scores. One or more components may be used for one iteration of a reward function input of the reinforcement learning 232.

As output for one iteration, the following can be expected: the revised message and its penalties and rewards. The penalties and rewards may be measured in the form of the matching score of the revised message.

The BERT model masking 236 is used to generate the iterations tailored message. Thereby, actions on the message 238 are made to adapt it in a way to be better tailored for the receiver. Approaches like word spinner, GPT2, a transformer, et cetera may be used.

As data is used throughout the process, communication history data is extracted from the appropriate communication system(s) to train the machine learning model and to help to tailor the message. The message data may comprise the text of the message, entities of the text, structuring of the text, length of the text, sentiment analysis data, personal knowledge data, insider data, tone analysis data, emoticons, emoji, additional graphics, links, and other data. The structuring of the text may include greetings or openings, main part or text body, et cetera. The length of the text may include, for example, the measurement of the text bloc, the number of characters in words or in the message overall, the word count, or the number of paragraphs in the communication.

Meta data can also be used. Meta data may include the date and time of a message, the type of channel, and other data that provides information about the communications. The type of channel may be, for example, email, chat, or phone call. The following is often seen as relevant sender data: the profile of a person, an expertise level of the persons related to the text, and other information which may help a sender send a tailored message. The profile of a person may include the person's gender, age, personality insight profiles, et cetera. The expertise level of the persons related to the text may be based on the entity extraction.

The receiver data may comprise profile data of a person and the expertise level of the person related to the text. The profile of a person may include the person's gender, age, personality insight profiles, et cetera. The expertise level of the persons related to the text may be based on the entity extraction.

Furthermore, relationship data may comprise the number of historic actions, familiarity between the sender and the receiver, a level of how much the two have communicated above the given topic(s), entity analysis data to determine whether the receiver has the same knowledge, whether the message is "matching", and other factors.

Additionally, a matching value may comprise values varying between 0% and 100% for each individual communication calculated based on historical back-and-fourth communication. Hence, all available communication and data channels expressing a relation between two communication partners as well as context information may be used to tailor and optimize a newly drafted message without changing the intent.

Figure 3:
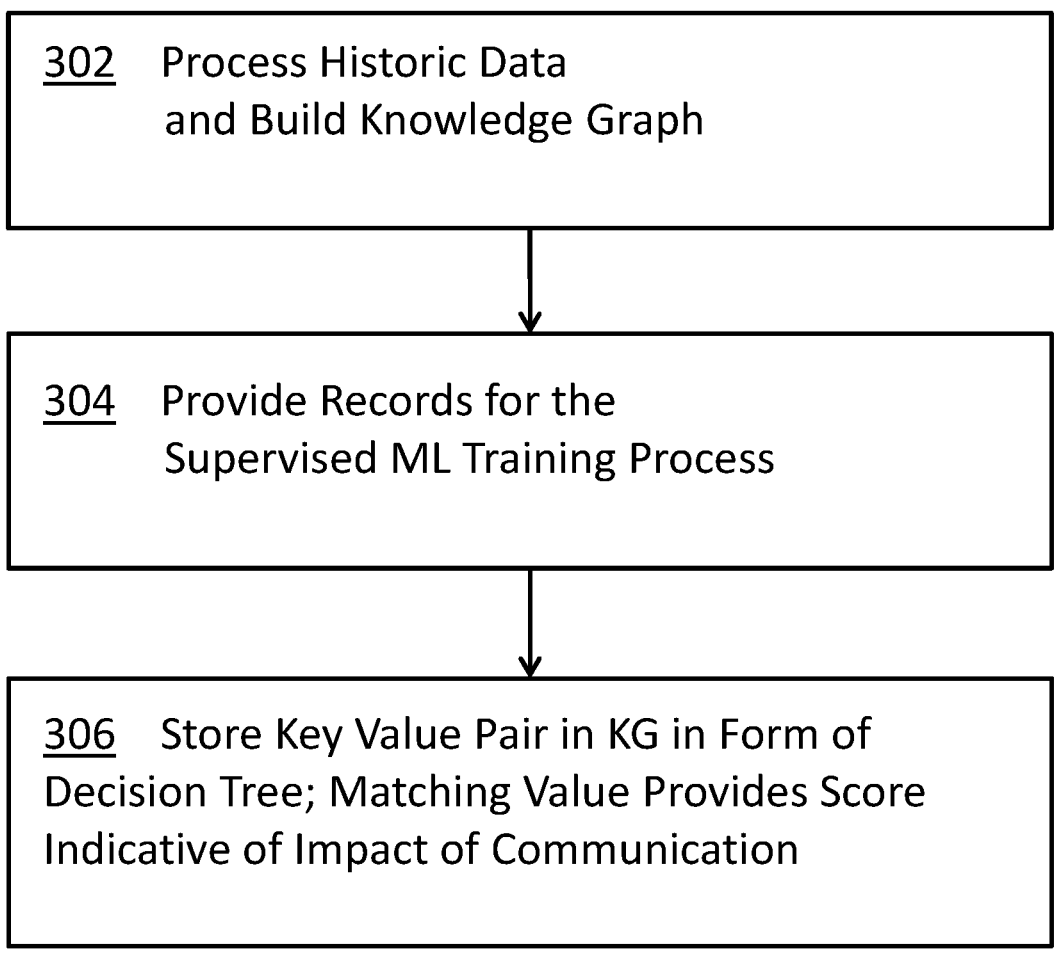
FIG. 3 shows an exemplary flow chart diagram of preparatory steps for the method for personalizing a message between a sender and a receiver.
Figure 4:
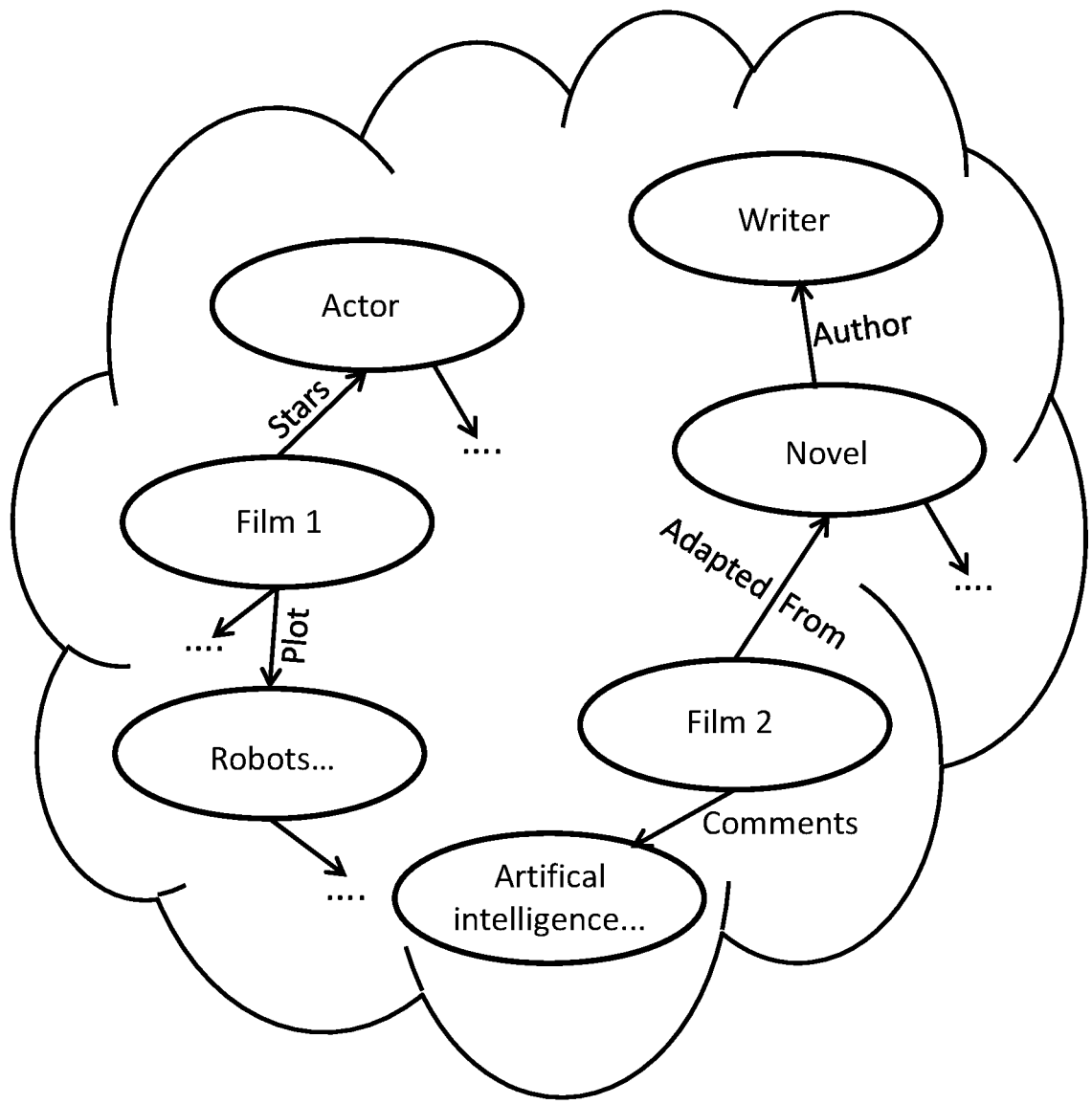
FIG. 4 shows an exemplary diagram of a portion of a knowledge graph.

FIG. 3 shows a flowchart diagram illustrating the above-mentioned pre-processing method 300 from another perspective. Historic communication data is analyzed, processed, and stored in the knowledge graph at operation 302. This analysis, processing, and storage in the knowledge graph, at operation 302, is equivalent to semantically analyzing communication history, at operation 102, and forming a knowledge graph, at operation 104, in FIG. 1. The knowledge graph comprises notes, or vertices, and relations, or edges, which also may have labels and properties. The knowledge graph is especially helpful to represent relationship information between the respective sender and the receiver; this may be shown as a sender/receiver pair or a plurality of sender/receiver pairs. In addition, entities may be added with timestamps to see when communication happened related to certain topics. The knowledge graph may also include general information about the users which could be obtained from social networks or other information sources. This general information may include preferences, likes, connections to other users, and other data. In another embodiment, the knowledge graph may also include back-and-forth communication between users; an example is illustrated in FIG. 4 below.

The communication together with information from the knowledge graph is then processed to provide records for the second machine learning model at operation 304. The second machine learning model may be a supervised learning model. Each record of the supervised machine learning model may come from a message sent from a sender to a receiver.

The formality levels can be categorized by numerically scoring the formality. In a five-tier gradient series, a "1" may refer to professional, a "3" may indicate a semi-professional engagement, and a "5" may refer to a completely informal level of conversation. The conversation levels are trained based on a bag of words algorithm in the language the users are using. A baseline dictionary may be used in a bag of words algorithm. A formal and informal baseline dictionary can be stored in a data storage or database to begin with. An example of such a baseline is shown in the following table to give an idea of the concept:

TABLE 1

| Formal | Informal |
| --- | --- |
| How do you do? | What's up? |
| If you wouldn't mind, I would like to request a change. | Can you change . . . |
| This is a most wonderful idea, my friend. | Great idea, buddy! |
| We concur, let us move forward. | We agree, let's do it. |

A personalized or customized set of words may be added to the bag of words to categorize them in a scoring pair. Each pair may be scored. In accordance with a five-tier gradient, the pairs may be scored from one to five. Once the classification is completed on the training set, a Gaussian Naïve Bayes (GaussianNB) classifier may be used to classify the formality level and derive the strategy for a response in an appropriate fashion.

Once the classifier has provided the formality scores, the scores are stored in the knowledge graph, at operation 306, as dependent attributes in the form of a key value pair {"user", "formality score"}. The key value pair is stored in the knowledge graph in the form of a decision tree and the matching value provides a score indicating the impact a past communication interaction had at operation 306.

As a part of further personalization, a bag of words with GaussianNB classifier may be used. The reply of a message may be analyzed to derive a formality score and store it in the same structure as an appended value. Further, metadata information may be stored in the user's dictionary and appended to the knowledge graph. Impact may be defined in the form of an output graph through a combination of factors. Impact factors may include presence or absence of a reply, timing of a reply, timing of a reply in relation to other replies by the same recipients, timing of a reply in relation to replies by different recipients, timing of a reply in relation to time zones and calendars, presence or absence of out-of-office messages, length of a reply, content of a reply, a reply confirming a task requested by the sender that is performed by the receiver, and other factors. Note that the reply may also include emoji reactions, likes, and other informal communicative indications by recipients.

Once the system has the information about a partial intent of a user's partial sentence and detects a level of formality score from a previous section of communication, the information may be fed into a bi-directional transformer BERT model. The information may then be used to train the proposed underlying system based on partial sentence constructions and mask pieces of information in between the phrases. The partial sentence constructions and mask pieces of information may then be trained using a level of engagement algorithm.

As part of the training step, masked information is hidden during the training phase and the hidden information is used as an output to be predicted. Output predictions are based on previous communication logs, levels of engagement, and other data. These predictions may train a transformer to predict the intent based on partial utterances by predicting the masked information. The predictive insight information is provided to a RL model to fine tune it based on engagement feedback.

Additional details for the BERT model implementation comprise also:
1. {"user":"} engagement score (1-5 which can be normalized using a standardization interval of [0,1)"} leads to the information obtained from "Bag of Words" with NB-Classifier.
2. json payload is used to append other metrics from the interaction 1 in the form of list to the script, e.g.:
   a. {User: engagement_score, additional_payload: [recipient, timestamp, calendar_context (previous/next meeting)]
   b. Log file analysis from previous step is appended to payload as additional metadata as well.
3. The above payload is fed as a scoring metric. It is extracted from payload as weighted vector: e.g., new payload to be fed to BERT involves: {User1_sentence, Recipient_exchange, overall_scoring_metric: sigmoid (w0*engagement_score+w1*timestamp+ w2*calendar+w3*meeting)
4. BERT model may take Sentence1 and Sentence2. Sentence1 and Sentence2 may be a combination of information exchanges. (It can be a series of logs as well, but for simplicity, here only the past exchange of conversation is considered.) It may be appended into the categorical input vector as follows:
   a. {Sentence1 AND Sentence2; Overall_scoring_metric}
      i. Now, Sentence1 is separately added into the BERT model. When trained, the input sequence goes through the transformer model.
      ii. Words which indicated high score metric are masked during token embedding phase using a masked feature vector. A high score metric may be, for example, those with formality level >0.7.
      iii. If the masked feature vector is removed based on previous logs, the used code scrapes the engagement level to see the score change. The scores compared for a change value may be, for example, scores with and without those critical pieces. Various coding languages may be used; for example, Python code may be used to scrape the engagement level to identify a score change.
      iv. Different pieces of information are masked within the sentence. This feeds back to bag of words to output a score probability.
      v. The iteration repeats. The repeat analysis feeds into the RL model in the form of a numerical feature vector as a state input for a given user.
      vi. RL model fine tunes the response and again goes back to the BERT model in the form of feedback to provide more information of what information or piece of snippet can be added to a given masked piece to create more impact.
      vii. Identifying a response from a recipient and extracting sentiment using natural language processing (NLP) is an enabling art which is fed back into RL loop as the state vector. If detecting positive feedback, the reward function does not poll the BERT model to perform another masking and prediction operation. If the reward function detects a negative impact factor value, the BERT model is applied again for a new iteration.
      viii. As one iterates though the sentence and masking certain words and/or phrases, the BERT model is now used in direct fashion to predict the Sentence2 to maximize the impact factor.
5. The adjusted messages are scored. The best version may be used with the penalty and/or reward for the next iteration until the quality meets a standard or expectation. The penalty and/or reward may be, or may be required to meet or exceed, a match value.

In another implementation, the calculation of the impact a message may also take into account sensor and computer vision data. The calculation of the impact of a message may be expressed by a matching value. Such a calculation may be done by dividing the existing methods for learners' engagement detection into categories based on the strategy and type of involvement of the user in the engagement detection process. Three main category types which may be used are automatic, semi-automatic, and manual.

Methods related to engagement tracing may be categorized as semi-automatic in taxonomy. Methods in an automatic category may be divided into computer vision based methods, sensor data analysis, and log-file analysis depending on the information that each method processes for engagement detection.

These steps are typically required to bring the method and a system using the method into production. Afterward an initial iteration, the steps may regularly be repeated to re-train the system.

Regarding the reinforcement learning system, the aim of the RL is to tailor the message so that it has more impact. Each iteration of the RL needs at least one scoring with the pre-trained supervised ML model to determine whether or not there has been any impact.

The state of the RL agent may be determined based on all of the information of the message, the metadata, the sender, the receiver, the relationship between sender and receiver, analysis results, and knowledge graph. However, it has only a predicted impact of the message "match value" as its penalty and/or reward. Thus, the system adapts to learn how to behave and is also tailored to the specific content and people involved.

The RL can interactively manipulate the message with the following techniques:
   use word replacement, sentence structure spinning, content reordering, and content deletion,
   re-shuffle the order of the message blocks,
   use synonyms,
   include words or phrases used by the receiver in a past communication,
   adjust the style which may be guided with the personality insights profile from the receiver,
   use a GPT2 Transformer,
   and more.

The adjusted messages are scored. The best version may be used with a penalty and/or reward for the next iteration until the quality meets a standard. The penalty and/or reward may be, or may need to meet or exceed, a set match value.

The following extension and enhancements may also be implemented.

Colors may be used to show the sender that the message is not yet optimal. Colors may also direct input and/or adjustments from the sender. Color indicators may include, for example, green, amber, and/or red to indicate go, caution, and stop, respectively.

A system may recognize if a message does not have enough explanation for the receiver. The system may add context or definitions to compensate. Context and definitions may come from external sources. For example, information may be imported directly from a website.

A model like the IBM Debater/Speech by Crowd may be used to raise questions the recipient might have in order to optimize the communication; such a model may help answer questions before they are raised to prevent back and forth communication.

The system can make use of a GAN-like (Generative Adversarial Network) setup of two competing models to recreate the text; the differentiator would be the model scoring (green/amber/red), the generator would create modified versions of the email.

In another embodiment, the method can be implemented to extend and complete part of a text instead of starting with a complete message and creating different versions.

In one embodiment, a real-time analysis of communication may be performed to advise how to get a certain message across through additional means other than the content. For example, other means may include using certain tonal cues and/or non-verbal communication. Real-time analysis of communication may include conversations via email, over instant messaging platforms, via phone, and/or face-to-face. Advice may be offered in a virtual reality setting.

FIG. 4 shows an exemplary diagram of a portion of a knowledge graph 400. Knowledge graph 400 represents a sample conversation with explainable reasoning. Knowledge graph 400 reflects a conversation flow on an augmented knowledge graph. One of the communication partners may have stated: "I prefer the ending in 'Film' directed by Director." His communication partner may have answered: "Three movie attempts essentially ruined the Film; 'Second Film' was far more original." As depicted, the knowledge graph 400 may analyze the communication ant identify the Film has an Actor as a "star," however, the knowledge graph 400 may realize the Actor does not lead to a logical (e.g., in the sense of a neural system) cross between the Film and the Second Film, so the knowledge graph 400 may identify the plot of the Film as including Robots. In some embodiments, the knowledge graph 400 may simultaneously analyzing the meaning behind Second Film and identify that Second Film was adapted from a Novel, whose author was a Writer. The knowledge graph 400 may realize such a chain does not lead to a logical cross and further realize there are comments (e.g., website synopsizes, reviews, etc.) relating to the Second Film that identify Artificial Intelligence in Film 2. The knowledge graph 400 may identify the logical cross connecting the Film to the Second Film is that Robots and Artificial Intelligence generally relate.

Figure 5:
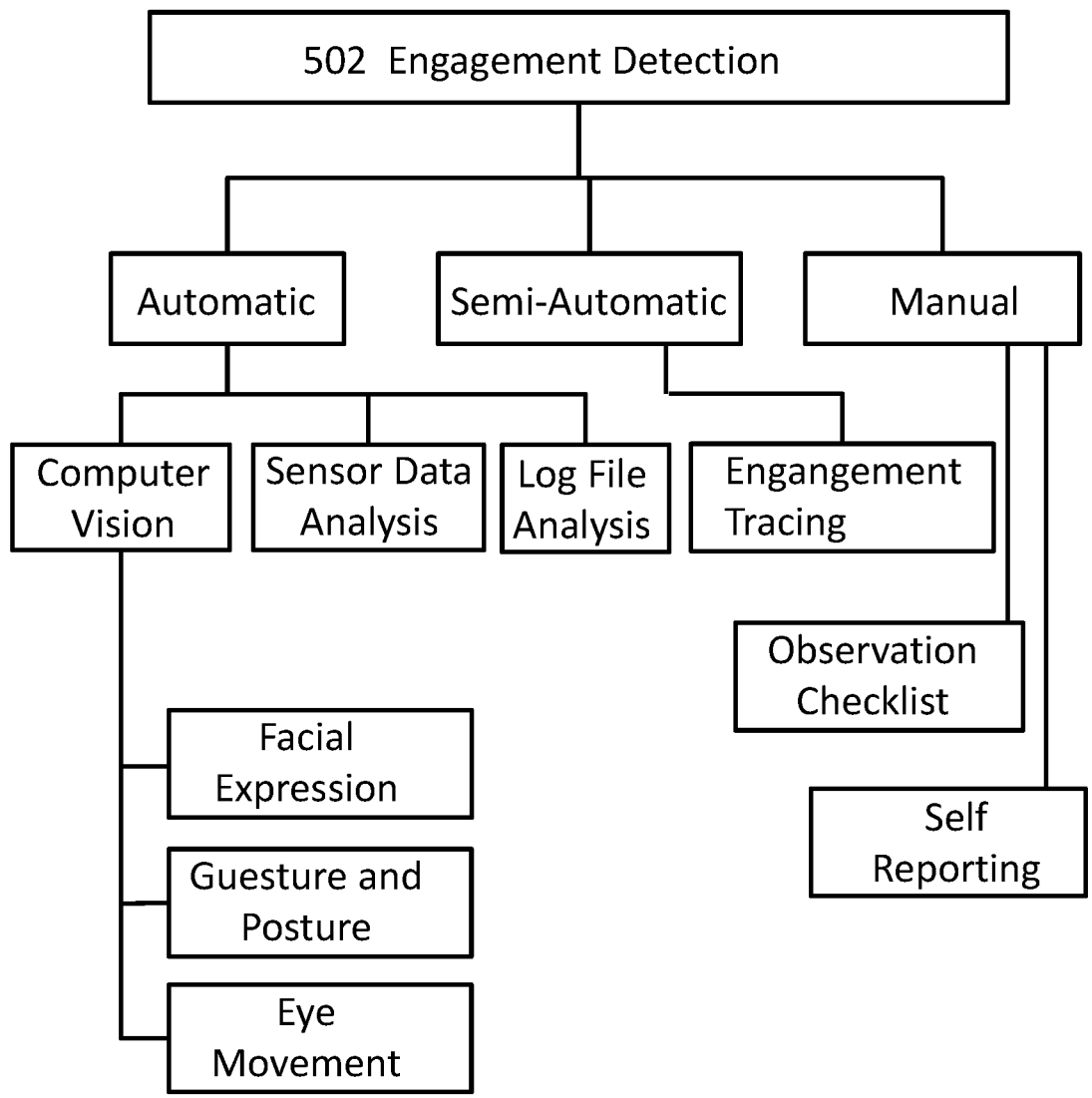
FIG. 5 shows a diagram of options to be used during an analysis phase for the engagement detection.

FIG. 5 shows a diagram of options 500 which may be used during the analysis phase for the engagement detection 502 in order to develop the knowledge graph 400. It may, for example, be performed in an automatic, semi-automatic, and/or manual way. The lower branches in the tree-like structure show the technical option of technologies to be implemented. For example, the computer-vision based approach may require a plurality of sophisticated sensors; such sophisticated sensors may be optical sensors such as cameras.

Figure 6:
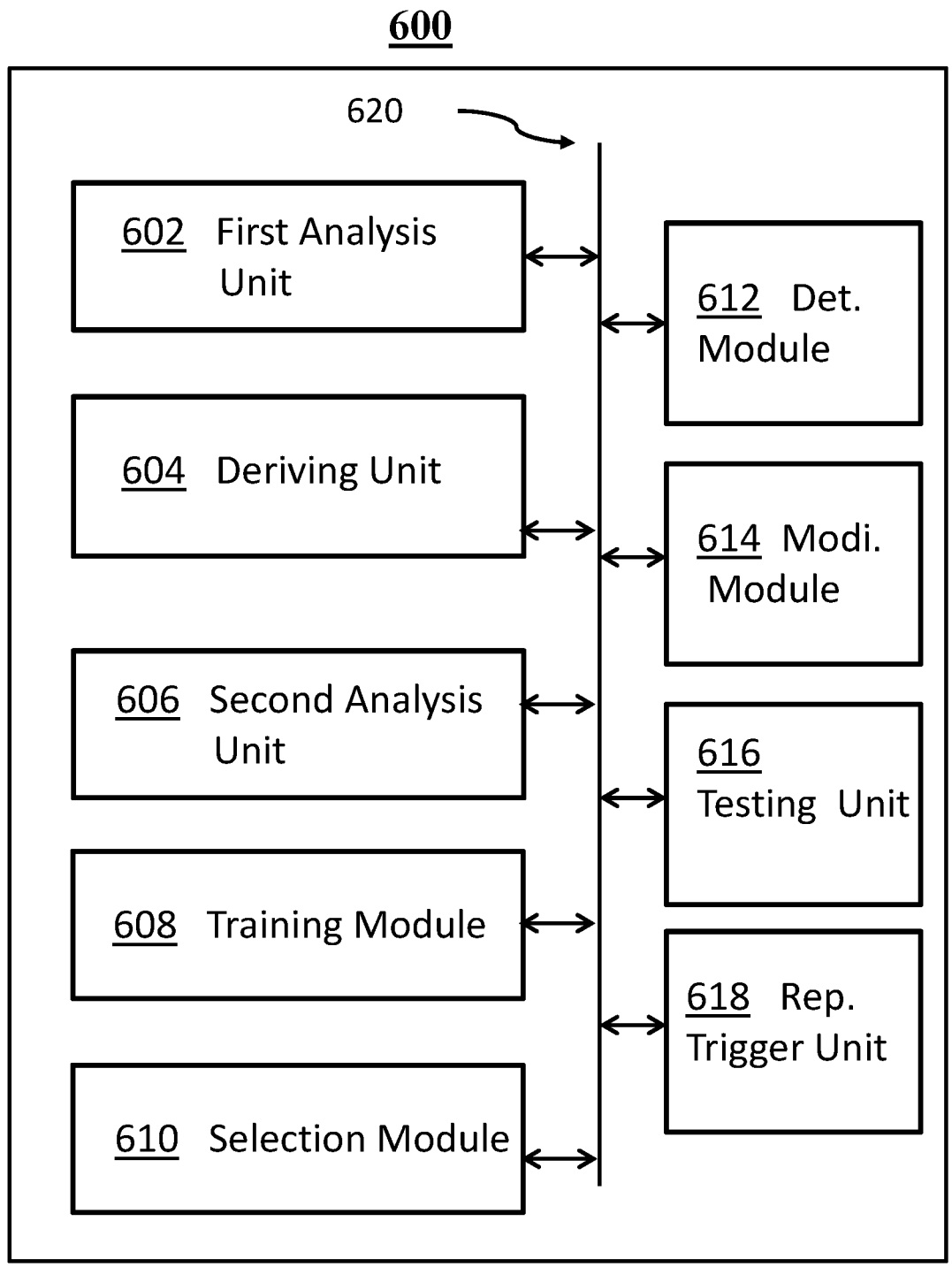
FIG. 6 shows a block diagram of an embodiment of the message personalizing system for personalizing a message between the sender and the receiver.

FIG. 6 shows a block diagram of components of the message personalizing system 600 for personalizing a message between a sender and a receiver. Message personalizing system 600 comprises first analysis means adapted for semantically analysing a communication history between the sender and the receiver. The first analysis means is also adapted for forming a knowledge graph between a sender identifier identifying the sender and a receiver identifier identifying the receiver. As depicted, the first analysis means is a first analysis unit 602.

Message personalizing system 600 also comprises deriving means adapted for deriving from the knowledge graph formality level values between the sender and the receiver. As depicted, deriving means is deriving unit 604. Message personalizing system 600 uses a first trained machine-learning model and second analysis means adapted for analysing parameter values of replies in the communication history to determine receiver impact score values. As depicted, the second analysis means is second analysis unit 606.

Furthermore, message personalizing system 600 comprises a training means adapted for training a second machine-learning system to generate a model to predict the receiver impact score value based on the knowledge graph and the formality level. As depicted, the training means is training module 608. Message personalizing system 600 also includes a selection means adapted for selecting a linguistic expression in a message being drafted. As depicted, the selection means is selection module 610. Message personalizing system 600 further includes a determination means adapted for determining an expression intent of the selected linguistic expression. As depicted, the determination means is a determination module 612. Message personalizing system 600 also includes a modification means adapted for modifying the linguistic expression based on the formality level and the expression intent which thereby generates a modified linguistic expression. As depicted, the modification means is modification module 614.

Moreover, message personalizing system 600 comprises a test means adapted for testing whether the modified linguistic expression has an increased likelihood to lead to a higher receiver impact score value using a third trained machine-learning model. As depicted, the test means is testing unit 616. Message personalizing system 600 also includes a repetition means adapted for triggering selection means, the determination means, modification means, and the test means until a stop criterion is met. As depicted, the repetition means is a repetition trigger unit 618.

The first analysis unit 602, deriving unit 604, second analysis unit 606, training module 608, selection module 610, determination module 612, modification module 614, testing unit 616, and repetition trigger unit 618 are communicatively coupled to exchange signals and messages. Alternatively, to a 1:1 connection schema or a message personalizing system 600 internal bus system 620 can be used for the signals and message transfer between the units and modules.

Figure 7:
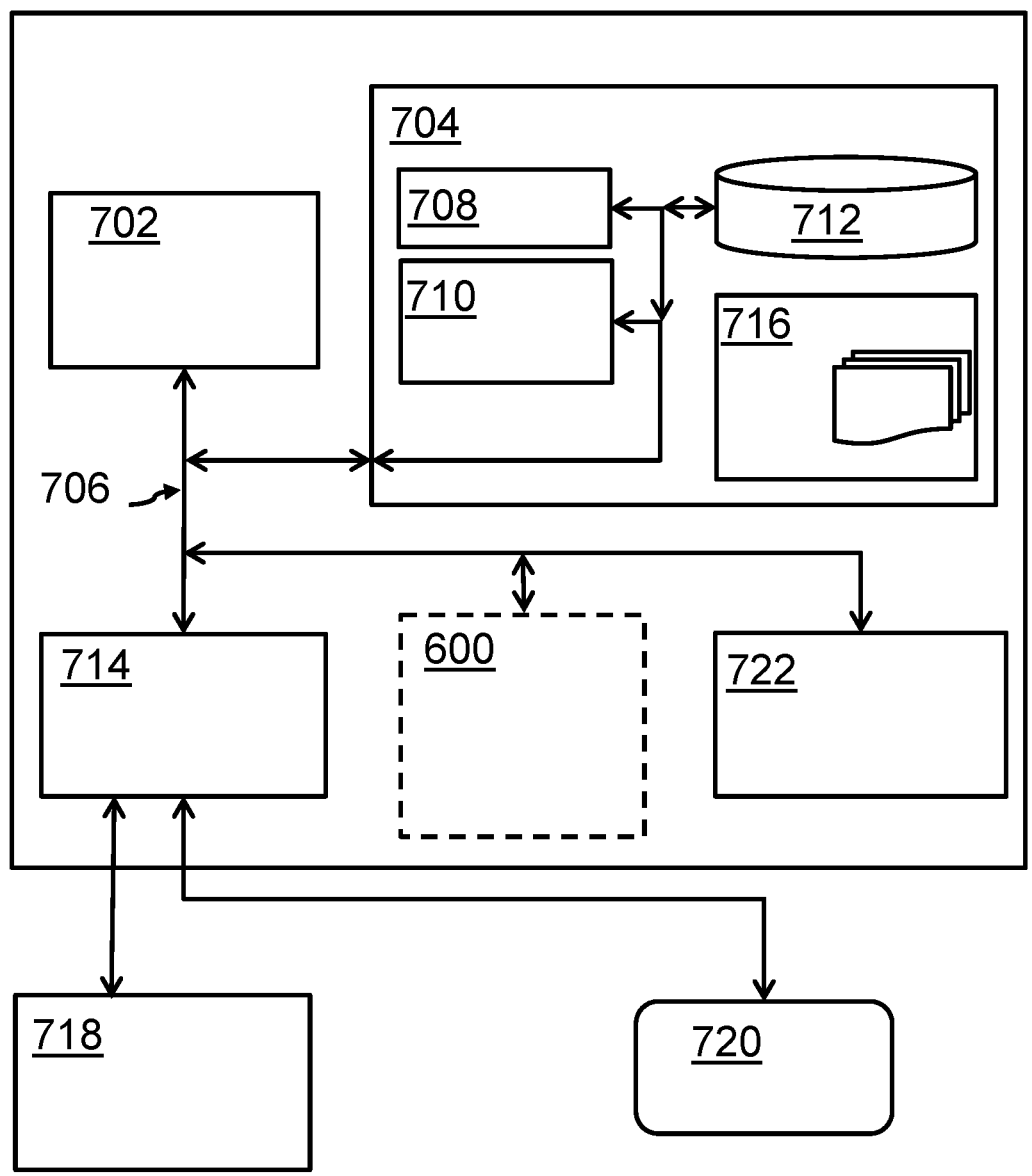
FIG. 7 shows a block diagram of an embodiment of a computing system comprising the message personalizing system according to FIG. 6.

Embodiments of the disclosure may be implemented together with virtually any type of computer, regardless of platform suitability for storing and/or executing program code. FIG. 7 shows, as an example, a computing system 700 suitable for executing program code related to the proposed method. Computing system 700 may be, for example, a server.

Computing system 700 is only one example of a suitable computer system and is not intended to suggest any limitation as to the scope of use or functionality of embodiments of the disclosure described herein. In computer system 700, there are components which are operational with numerous other general purposes or special purpose computing system environments or configurations. Examples of well-known computing systems, environments, and/or configurations that may be suitable for use with computer system 700 include, but are not limited to, personal computer systems, server computer systems, thin clients, thick clients, handheld devices, laptop devices, multiprocessor systems, microprocessor-based systems, set top boxes, programmable consumer electronics, network PCs, minicomputer systems, mainframe computer systems, distributed cloud computing environments that include any of the above systems or devices, and the like. Computer system 700 may be described in the general context of computer system-executable instructions such as program modules. Such computer system-executable instructions are able to be executed by computer system 700. Generally, program modules may include routines, programs, objects, components, logic, data structures, and so on. Such modules perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media, including memory storage devices.

Computer system/server 700 is shown in the form of a general-purpose computing device. The components of computer system 700 may include, but are not limited to, one or more processors or processing units 702, a system memory 704, and a bus 706 that couple various system components to a processor 702. Bus 706 represents one or more of any of several types of bus structures including a memory bus, a memory controller, a peripheral bus, an accelerated graphics port, a processor, and a local bus using any of a variety of bus architectures. By way of example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system 700. Such media includes both volatile and non-volatile media as well as both removable and non-removable media.

System memory 704 may include computer system readable media in the form of volatile memory, such as random access memory (RAM) 708 and/or cache memory 710. Computer system 700 may further include other removable and/or non-removable, volatile and/or non-volatile computer system storage media. By way of example only, a storage system 712 may be provided for reading from and writing to a non-removable, non-volatile magnetic media (not shown). Such a non-removable, non-volatile magnetic media is typically called a hard drive. Although not shown, a magnetic disk drive for reading from and writing to a removable, non-volatile magnetic disk and/or an optical disk drive for reading from or writing to a removable, non-volatile optical disk and/or other optical media may be provided. An example of a removable, non-volatile magnetic disk is a floppy disk. Examples of removable, non-volatile optical disks are a CD-ROM and a DVD-ROM. In such instances, each can be connected to bus 706 by one or more data media interfaces. As will be further depicted and described below, memory 704 may include at least one program product having at least one program module that configured to carry out the functions of embodiments of the disclosure. The one or more program modules may be described as being a set, regardless of whether a singular module or plural modules.

The program/utility has a program module set 716. The program/utility may be stored in memory 704. An operating system, one or more application programs, other program modules, and program data may also be stored in memory 704. Each of the operating systems, one or more application programs, other program modules, and program data, or some combination thereof may include an implementation of a networking environment. Program module set 716 generally carries out the functions and/or methodologies of embodiments of the disclosure, as described herein.

Computer system 700 may also communicate with one or more external devices 718 such as a keyboard, a pointing device, a display 720, and other computer peripherals. Computer system 700 may also communicate with one or more devices that may enable a user to interact with computer system 700. Computer system 700 may also communicate with any devices that enable computer system 700 to communicate with one or more other computing devices; such devices may include a network card, a modem, and other telecommunication devices and/or components. Such communication can occur via Input/Output (I/O) interfaces 714. Computer system 700 may also communicate with one or more networks such as a local area network (LAN), a general wide area network (WAN), and/or a public network via network adapter 722. A public network may include, for example, the Internet. As depicted, network adapter 722 may communicate with other components of computer system 700 via bus 706. Although not shown, other hardware and/or software components may be used in conjunction with computer system 700. Examples of other hardware and/or software which may be used with computer system 700 include, but are not limited to: microcode, device drivers, redundant processing units, external disk drive arrays, RAID systems, tape drives, and data archival storage systems.

Additionally, message personalizing system 600 for personalizing a message between a sender and a receiver may be attached to the bus system 706.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
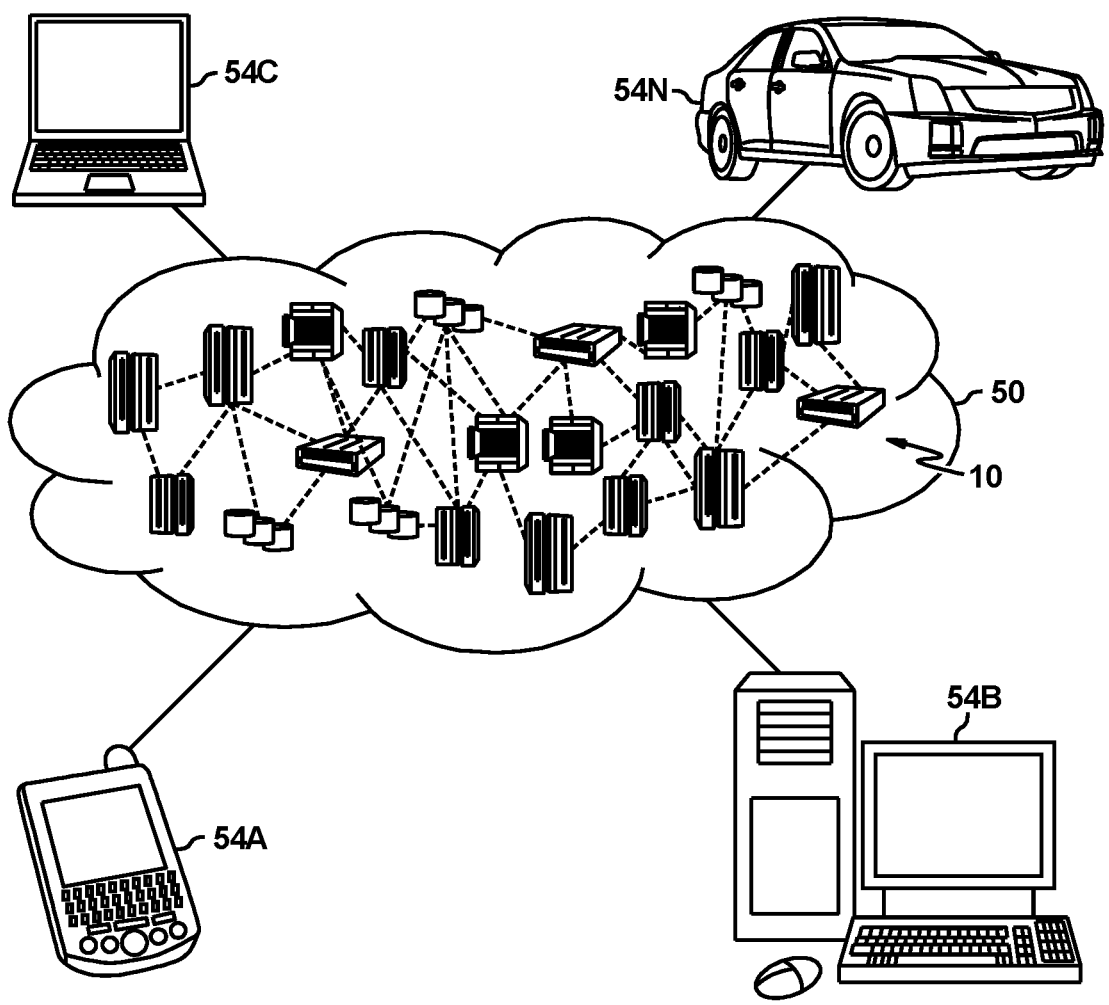
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
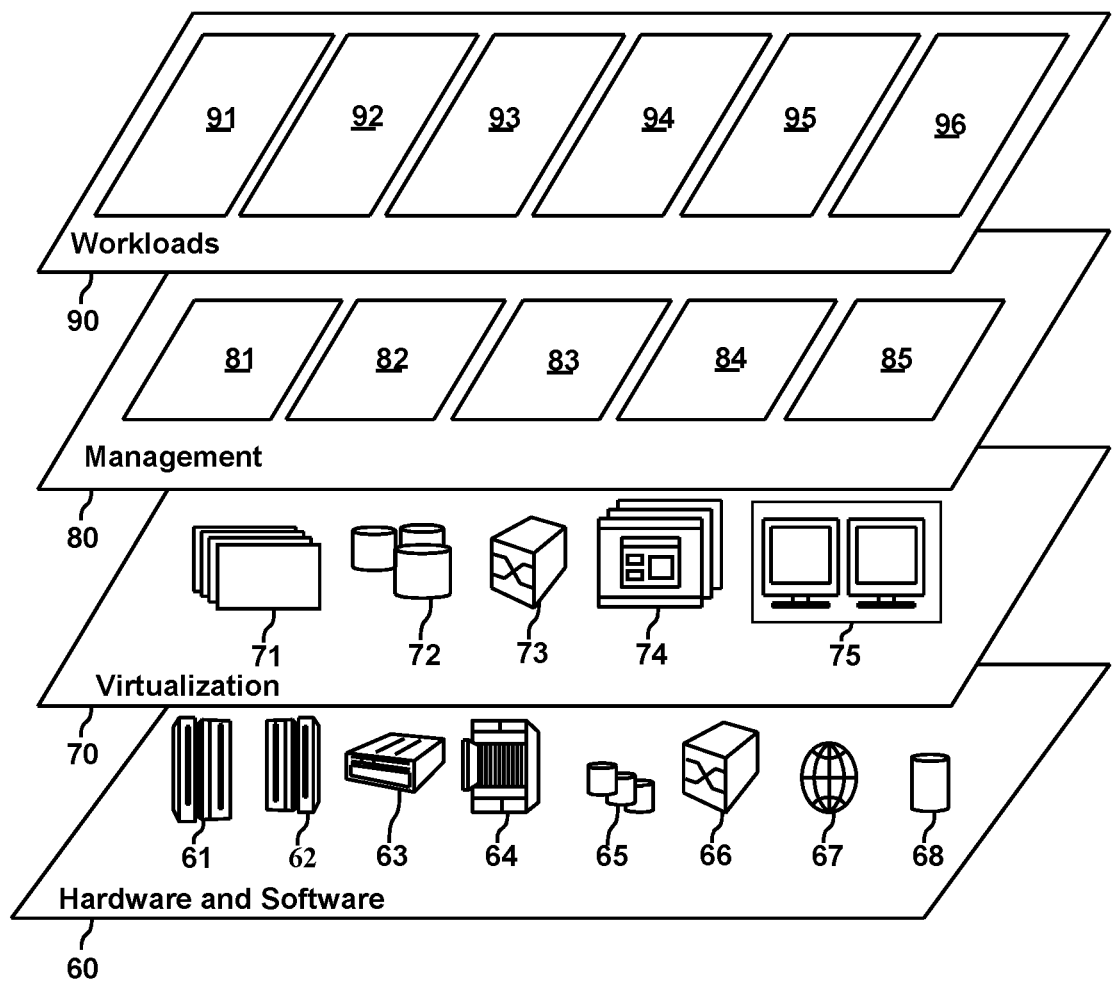
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication content tailoring 96.

The descriptions of the various embodiments of the present disclosure have been presented for purposes of illustration. The descriptions are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application, or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium or media having computer readable program instructions thereon for causing a processor to carry out aspects of the present disclosure.

The medium may be an electronic, magnetic, optical, electromagnetic, infrared, or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), DVD, and Blu-Ray disk.

A computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media such as light pulses passing through a fiber-optic cable, or electrical signals transmitted through a wire.

Computer readable program instructions described herein can be downloaded to respective computing/processing devices from a computer readable storage medium or to an external computer or external storage device via a network. Examples of networks include the Internet, a local area network, a wide area network, and/or a wireless network. A network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, source code, and/or object code. Source code and/or object code may be written in any combination of one or more programming languages, including an object-oriented programming language, such as Smalltalk and C++, and/or conventional procedural programming languages, such as the "C" programming language.

Computer readable program instructions may execute entirely on a user's computer, partly on a user's computer as a stand-alone software package, partly on a user's computer and partly on a remote computer, or entirely on a remote computer/server. In the scenario of execution entirely on a remote computer/server, the remote computer may be connected to the user's computer through any type of network; alternatively, the connection may be made to an external computer. Such network options include a local area network (LAN) and a wide area network (WAN). For example, a connection may be established through the Internet using an Internet Service Provider. In some embodiments, electronic circuitry including may execute the computer readable program instructions by utilizing state information of the computer readable program instructions to personalize the electronic circuitry in order to perform aspects of the present disclosure. Examples of electronic circuitry include, for example, programmable logic circuitry, field-programmable gate arrays (FPGA), and programmable logic arrays (PLA).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner. A computer readable storage medium having instructions stored therein comprises an article of manufacture including instructions which implement aspects of the function and/or act as specified in the flowchart and/or block diagram block or blocks.

The computer readable program instructions may also be loaded onto a computer, other programmable data processing apparatuses, or another device to cause a series of operational steps to be performed on the computer, other programmable apparatus, or other device to produce a computer implemented process. In such a case, the instructions which execute on the computer, other programmable apparatuses, or another device implement the functions and/or acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowcharts or block diagrams may represent a module, segment, or portion of instructions comprising one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an," and "the" are intended to include the plural forms as well unless the context clearly indicates otherwise. It will further be understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means- or steps-plus-function elements in the claims below are intended to include any structure, material, or act for performing the function in combination with other claimed elements, as specifically claimed. The description of the present disclosure has been presented for purposes of illustration and description; it is not intended to be exhaustive or limited to the disclosure in the form disclosed. Many modifications and variations will be apparent to those of ordinary skill in the art without departing from the scope and spirit of the disclosure. The embodiments are chosen and described in order to best explain the principles of the disclosure and the practical application and to enable others of ordinary skill in the art to understand the disclosure for various embodiments with various modifications as such modifications are suited to the particular use contemplated.

What is claimed is:

1. A method for personalizing a message between a sender and a receiver, said method comprising:
    semantically analyzing a communication history between said sender and said receiver and forming a knowledge graph between a sender identifier identifying said sender and a receiver identifier identifying said receiver;
    deriving a formality level between said sender and said receiver from said knowledge graph using a first trained machine-learning model;
    analyzing parameter values of replies in said communication history to determine receiver impact score values;
    training a second machine-learning system to generate a model to predict said receiver impact score values based on said knowledge graph and said formality level;
    selecting a linguistic expression in a message being drafted;
    determining an expression intent of said selected linguistic expression;
    modifying said linguistic expression based on said formality level and said expression intent to generate a modified linguistic expression;
    testing whether said modified linguistic expression has an increased likelihood to lead to a higher receiver impact score value using a third trained machine-learning model; and
    repeating said selecting said linguistic expression, determining said expression intent, modifying said linguistic expression, and testing for said higher receiver impact score until a stop criterion is met.

2. The method according to claim 1 wherein said third machine-learning model is a reinforcement learning model.

3. The method according to claim 2 wherein said using of said third machine-learning model also comprises training a bi-directional transformer to predict said expression intent.

4. The method according to claim 3 wherein said training of said bi-directional transformer further comprises using said communication history, said knowledge graph, said formality level, and receiver impact score values as training data.

5. The method according to claim 1 wherein:
    said receiver identifier is a plurality of receiver identifiers used to identify a plurality of users, and
    said modified linguistic expression is built taking effects of all receiver identifiers into account.

6. The method according to claim 1 wherein said modification of said linguistic expression is influenced by outcomes of at least one selected out of said formality level analysis, a confidentiality level analysis of said message, a message topic analysis, and a tone analysis.

7. The method according to claim 1 wherein:
    said modification of said linguistic expression is performed by at least one selected from the group consisting of a replacement of a word, spinning of sentence structure, reordering of content, deletion of a word, re-shuffle an order of message blocks, use of synonyms, wording which was used by said receiver in past communication, adjustment of style, and a GPT2 transformer transformation, and
    said GPT2 transformer transformation is inculcated with partial sentence creation to generate a segment of a paragraph in a personalized manner by synthesizing personalized text for a user.

8. The method according to claim 1 wherein said semantic analysis of said communication history comprises:
   identifying topics with a latent Dirichlet allocation (LDA) topic model.

9. The method according to claim 1 wherein said formality level is obtained with a bag-of-words model and said first trained machine-learning model is a Gaussian Naïve Bayes classifier.

10. The method according to claim 1 wherein said linguistic expression is further refined by predicting a mood or task of said receiver at a time at which said message is set to arrive using IoT sensors or calendar information.

11. The method according to claim 1 wherein said receiver impact score is influenced by at least one selected out of the group consisting of IoT sensor data, wearable system data, computer vision data, presence/absence of a reply, timing of a reply, timing of said reply in relation to other replies by said receiver or different recipients, timing of said reply in relation to time zones and calendars, presence/absence of out-of-office messages, length of said reply, content of said reply, a task requested by said sender being carried out by said receiver, and an emoji.

12. The method according to claim 1 wherein said message is a written message or a voice message.

13. The method according to claim 1 wherein:
   said analysis of said communication history reveals a lack of said communication history, and
   a secondary communication history replaces said communication history, wherein said secondary communication history is between said receiver and a secondary sender.

14. A message personalizing system for personalizing a message between a sender and a receiver, said message personalizing system comprising:
   a memory; and
   a processor in communication with the memory, the processor being configured to perform operations comprising:
   semantically analyzing a communication history between said sender and said receiver and adapted for forming a knowledge graph between a sender identifier identifying said sender and a receiver identifier identifying said receiver;
   deriving from said knowledge graph a formality level between said sender and said receiver using a first trained machine-learning model;
   analyzing parameter values of replies in said communication history to determine receiver impact score values;
   training a second machine-learning system to generate a model to predict said receiver impact score values based on said knowledge graph and said formality level;
   selecting a linguistic expression in a message being drafted;
   determining an expression intent of said linguistic expression;
   modifying said linguistic expression based on said formality level and said expression intent to generate a modified linguistic expression;
   a testing if said modified linguistic expression has an increased likelihood of a higher receiver impact score value using a third trained machine-learning model; and
   repeating said selecting said linguistic expression, determining said expression intent, modifying said linguistic expression, and testing for said higher receiver impact score until a stop criterion is met.

15. The message personalizing system according to claim 14 wherein said third machine-learning model is a reinforcement learning model.

16. The message personalizing system according to claim 15 wherein said using of said third machine-learning model comprises:
   training a bi-directional transformer to predict said expression intent.

17. The message personalizing system according to claim 16 wherein said training of said bi-directional transformer comprises:
   using said communication history, said knowledge graph, said formality level, and said receiver impact score values as training data.

18. The message personalizing system according to claim 14 wherein:
   said receiver identifier is a plurality of receiver identifiers used to identify a plurality of users, and
   said modification means generates said modified linguistic expression based on said formality level and said expression intent between said sender and said plurality of users.

19. The message personalizing system according to claim 14 wherein said modification of said linguistic expression is influenced by outcomes of at least one selected from the group consisting of said formality level analysis, a confidentiality level analysis of said message, a message topic analysis, and a tone analysis.

20. The message personalizing system according to claim 14 wherein:
   said modification of said linguistic expression is performed by at least one selected from the group consisting of a replacement of a word, spinning of sentence structure, reordering of content, deletion of a word, re-shuffle an order of message blocks, use of synonyms, wording which was used by said receiver in past communication, adjustment of style, and a GPT2 transformer transformation, and
   said GPT2 transformer transformation is inculcated with partial sentence creation to generate a segment of said paragraph in a personalized manner by synthesizing personalized text for a user.

21. The message personalizing system according to claim 14 wherein said semantic analysis of said communication history comprises identifying topics with a latent Dirichlet allocation (LDA) topic model.

22. The message personalizing system according to claim 14 wherein said formality level is obtained with a bag-of-words model and said first trained machine-learning model is a Gaussian Naïve Bayes classifier.

23. The message personalizing system according to claim 14 wherein said linguistic expression is further refined by predicting a mood or a task of said receiver at a time at which said message is set to arrive using IoT sensors or calendar information.

24. The message personalizing system according to claim 14 wherein said receiver impact score is influenced by at least one selected from the group consisting of IoT sensor data, wearable system data, computer vision data, presence/absence of a reply, timing of a reply, timing of a reply in relation to other replies by said receiver or different recipients, timing of a reply in relation to time zones and calendars, presence/absence of out-of-office messages, length of said reply, content of said reply, a task requested by said sender being carried out by said receiver, and an emoji.

25. A computer program product for personalizing a message between a sender and a receiver, said computer program product comprising a computer readable storage medium having program instructions embodied therewith, said program instructions being executable by one or more computing systems or controllers to cause said one or more computing systems to:
- analyze, semantically, a communication history between said sender and said receiver to generate an analysis wherein said analysis is adapted for forming a knowledge graph between a sender identifier identifying said sender and a receiver identifier identifying said receiver,
- derive from said knowledge graph a formality level between said sender and said receiver using a first trained machine-learning model,
- analyze parameter values of replies in said communication history to determine receiver impact score values,
- train a second machine-learning system to generate a model to predict said receiver impact score value based on said knowledge graph and said formality level,
- select a linguistic expression in a message being drafted,
- determine an expression intent of said linguistic expression,
- generate a modified linguistic expression by modifying said linguistic expression based on said formality level and said expression intent to,
- test whether said modified linguistic expression has an increased likelihood of a higher receiver impact score value by using a third trained machine-learning model, and
- repeat said program instruction of said selection, said determination, said generation, and said test until a stop criterion is met.

* * * * *